(12) United States Patent
Kim

(10) Patent No.: US 8,570,321 B2
(45) Date of Patent: *Oct. 29, 2013

(54) RASTERIZATION ENGINE AND THREE-DIMENSIONAL GRAPHICS SYSTEM FOR RASTERIZING IN ORDER ADAPTED TO CHARACTERISTICS OF POLYGON

(71) Applicant: Samsung Electronics Co., Ltd., Suwon-si (KR)

(72) Inventor: Chun Ho Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/662,609

(22) Filed: Oct. 29, 2012

(65) Prior Publication Data

US 2013/0050211 A1    Feb. 28, 2013

Related U.S. Application Data

(63) Continuation of application No. 12/313,886, filed on Nov. 25, 2008, now Pat. No. 8,300,045.

(30) Foreign Application Priority Data

Dec. 7, 2007   (KR) .................. 10-2007-0126848

(51) Int. Cl.
   *G06T 17/00*   (2006.01)
(52) U.S. Cl.
   USPC ........................................ 345/420; 345/582
(58) Field of Classification Search
   USPC ................................. 345/420, 582
   See application file for complete search history.

(56) References Cited

U.S. PATENT DOCUMENTS

| 6,028,607 | A | 2/2000 | Chan |
| 6,160,559 | A | 12/2000 | Omtzigt |
| 7,551,178 | B2 | 6/2009 | Chung et al. |
| 8,300,045 | B2 * | 10/2012 | Kim .............................. 345/419 |
| 2002/0158865 | A1 | 10/2002 | Dye et al. |
| 2004/0164985 | A1 | 8/2004 | Kato et al. |
| 2006/0274077 | A1 | 12/2006 | Chung et al. |
| 2009/0146999 | A1 | 6/2009 | Kim |

FOREIGN PATENT DOCUMENTS

| JP | 8-77338 | 3/1996 |
| KR | 10-2004-0028920 | 4/2004 |
| KR | 10-2006-0125269 | 12/2006 |

OTHER PUBLICATIONS

"Rasterization Engine and Three-Dimensional Graphics System for Rasterizing in Order Adapted to Characteristics of Polygon" Specification, Drawings, and Prosecution History, of U.S. Appl. No. 12/313,886, filed Nov. 25, 2008, by Chun Ho Kim.

* cited by examiner

*Primary Examiner* — Maurice L McDowell, Jr.
(74) *Attorney, Agent, or Firm* — Onello & Mello, LLP

(57) ABSTRACT

A three-dimensional graphics system is provided. The three-dimensional graphics system rasterizes each of a plurality of polygons generated from vertexes in an order adapted to characteristics of each polygon. The three-dimensional graphics system includes a rasterization engine including a polygon setup unit receiving the vertexes and generating the polygons and rasterization information for each polygon, and a rasterizer rasterizing pixels using the rasterization information received from the polygon setup unit in an order adapted to the characteristics of each polygon. Accordingly, the coherence of the pixels is increased and the hit ratio of cache memory is thus increased. As a result, the performance of the three-dimensional graphics system is improved. With the increase of the hit ratio of the cache memory, buss traffic in the system is reduced and power consumption is thus reduced.

15 Claims, 6 Drawing Sheets

RASTERIZATION ENGINE AND THREE-DIMENSIONAL GRAPHICS SYSTEM FOR RASTERIZING IN ORDER ADAPTED TO CHARACTERISTICS OF POLYGON

CROSS REFERENCE TO RELATED APPLICATIONS

This application is a continuation application of U.S. patent application Ser. No. 12/313,886, filed on Nov. 25, 2008, which claims the benefit of Korean Patent Application No. 10-2007-0126848, filed on Dec. 7, 2007, in the Korean Intellectual Property Office, the disclosure of which is incorporated herein in its entirety by reference.

FIELD OF INVENTION

The present invention relates to a rasterization engine and three-dimensional (3D) graphics system, and more particularly, to a rasterization engine and 3D graphics system for performing rasterization in order adapted to the characteristics of a polygon, such as use or non-use of texture mapping, use or non-use of alpha blending, and relationship with an adjacent polygon.

BACKGROUND

Three-dimensional (3D) graphics are graphics that show objects in three dimensions, instead of two dimensions, and are used in movies using special effects, geological analysis, and architecture or car designing using computer aided design (CAD). Recently, 3D graphics are being used to construct game screens.

To produce 3D graphics, 3D graphics systems break an object represented by lots of dots into polygons, e.g., triangles, comprising a plurality of pixels, perform interpolation on pixels included in each polygon through rasterization, and perform rendering (or presentation) of the 3D graphic. Conventional 3D graphics systems perform the rasterization in an order determined by considering pixel coherence within a triangle. For instance, conventional 3D graphics systems rasterize pixels forming a polygon in a span order. In other words, when a 3D graphics system generates pixels forming a triangle in a downward order, it performs rasterization of the triangle in the same order, i.e., in downward order.

The conventional 3D graphics systems consider only pixel coherence within a polygon when performing polygon rasterization. In other words, pixel coherence between polygons is not considered during the rasterization of the polygons. Consequently, when the 3D graphics systems move over to another polygon, the hit ratio of cache memory decreases and the performance of the 3D graphics systems deteriorates.

SUMMARY OF THE INVENTION

In accordance with the present invention, provided is a rasterization engine for increasing the performance of a three-dimensional (3D) graphics system by increasing the hit ratio of cache memory used in the 3D graphics system by increasing pixel coherence between polygons.

Also in accordance with the present invention, provided is a rasterization engine for performing rasterization in an order adapted to the characteristics of a polygon, such as use or non-use of texture mapping, use or non-use of alpha blending, and relationship with an adjacent polygon.

Also in accordance with the present invention, provided is a 3D graphics system using the rasterization engine.

According to one aspect of the present invention, there is provided a rasterization engine including a polygon setup unit configured to receive vertexes and generate polygons and rasterization information for each polygon. Also includes is a rasterizer configured to generate pixels using the rasterization information received from the polygon setup unit and to perform rasterization in an order adapted to characteristics of each polygon.

The rasterization engine may also include a texture unit configured to perform texturing on the pixels generated by the rasterizer.

The rasterizer may determine the order adapted to the characteristics of each polygon based on a prestored algorithm for determining rasterization order.

The rasterizer can execute the prestored algorithm to store information about a first position at which rasterization of a previous polygon has finished, and determine the rasterization order such that rasterization of a current polygon is performed from a second position adjacent to a first position and toward a third position farthest from the second position of the current polygon.

The rasterizer can execute the prestored algorithm to store order information about different types of rasterization orders, alternately select the different types of rasterization order, and determine a selected type of order as the order adapted to characteristics of a polygon to be rasterized.

The different types of rasterization order can comprise a downward order and an upward order, which may be alternately selected.

The rasterization engine can further comprise: an order determiner configured to receive information about the characteristics of each polygon from the rasterizer, determine the rasterization order for the polygon based on the information, and transmit the rasterization order to the rasterizer.

The order determiner can be configured to store information about a first position at which rasterization of a previous polygon has finished, and determine the rasterization order such that rasterization of a current polygon is performed from a second position adjacent to the first position toward a third position farthest from the second position of the current polygon.

The order determiner can be configured to store order information about different types of rasterization order in advance, alternately select the different types of rasterization order, and determine a selected type of order as the order adapted to characteristics of a polygon to be rasterized.

The order information can comprise a downward order and an upward order.

The order determiner can be configured to store information about an order used for a previous rasterization.

The order determiner can be configured to receive information about an order used for a previous rasterization from the rasterizer.

The order determiner can be configured to alternately select the different types of rasterization order such that selected rasterization order is adapted to characteristics of a polygon to be rasterized in a three-dimensional graphics system using texture mapping or alpha blending.

The polygons may be triangles.

The characteristics of each polygon may include at least one characteristic among use or non-use of texture mapping, use or non-use of alpha blending, and relationship with an adjacent polygon.

The rasterization engine may be used in any one or more of a 3D graphics system, a 3D graphics software accelerator, and a 3D graphics hardware accelerator.

For instance, in accordance with another aspect of the invention, provided is a three-dimensional graphics system. The system includes a rasterization engine configured to rasterize each of a plurality of polygons generated from vertexes defined by viewport mapping in an order adapted to characteristics of each polygon.

The rasterization engine may comprise a polygon setup unit configured to receive vertexes defined by viewport mapping and generate polygons and rasterization information for each polygon; a rasterizer configured to generate pixels using the rasterization information received from the polygon setup unit and perform rasterization in an order adapted to characteristics of each polygon; and a texture unit configured to perform texturing to give cubic effect to the pixels generated by the rasterizer.

The polygons may be triangles.

The characteristics of each polygon can comprise at least one characteristics among use or non-use of texture mapping, use or non-use of alpha blending, and relationship with an adjacent polygon.

And in accordance with another aspect of the invention, provided is a three-dimensional graphics software accelerator comprising a rasterization engine configured to rasterize each of a plurality of polygons generated from vertexes defined by viewport mapping in an order adapted to characteristics of each polygon.

And in accordance with another aspect of the invention, provided is a three-dimensional graphics hardware accelerator comprising a rasterization engine configured to rasterize each of polygons generated from vertexes defined by viewport mapping in an order adapted to characteristics of each polygon.

As described above, according to the embodiments of the present invention, rasterization order for a polygon is determined based on the relationship between the current polygon and an adjacent polygon. For instance, rasterization of a polygon starts from a position adjacent to a position at which rasterization of a previous polygon has been finished, thereby increasing pixel coherence. Accordingly, data remaining in cache memory after the rasterization of the previous polygon can be reused. As a result, the hit ratio of all cache memory (including texture cache) used after pixel generation is increased. With the increase of the hit ratio of cache memory, the performance of a 3D graphics system is increased and bus traffic in the system is reduced, so that power consumption is reduced.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings.

DETAILED DESCRIPTION OF THE INVENTION

Figure 1:
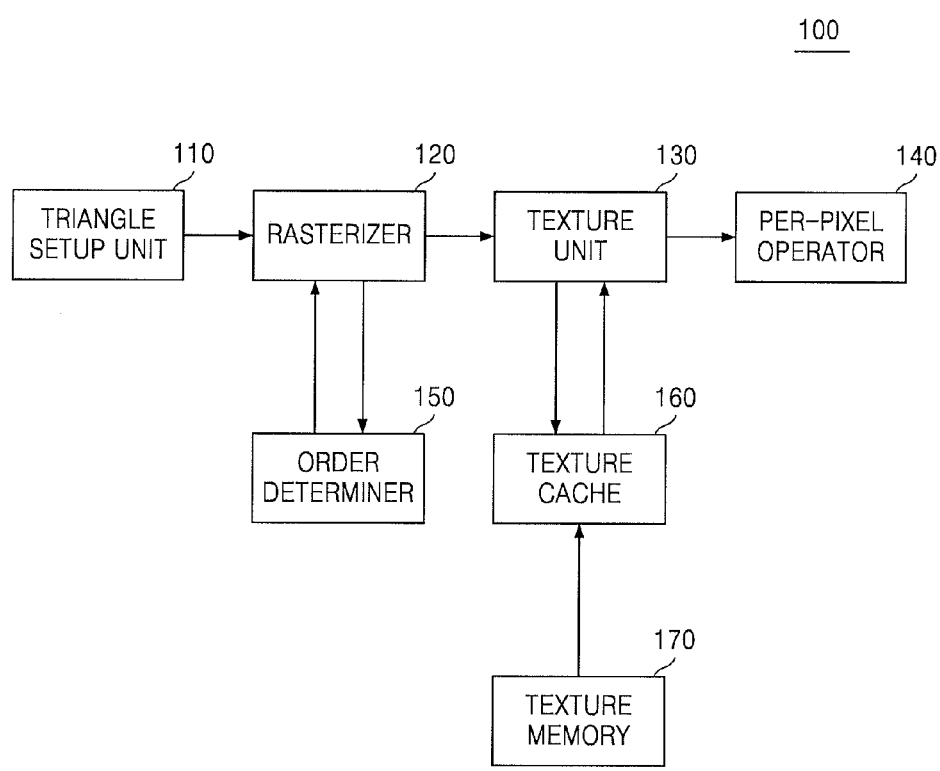
FIG. 1 is a block diagram of an embodiment of a 3D graphics system according to some aspects of the present invention.

Embodiments in accordance with the present invention will now be described more fully hereinafter with reference to the accompanying drawings. The invention may, however, be embodied in many different forms and should not be construed as limited to the embodiments set forth herein. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another. For example, a first signal could be termed a second signal and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

FIG. 1 is a block diagram of an embodiment of a three-dimensional (3D) graphics system 100 according to some aspects of the present invention. The 3D graphics system 100 includes a polygon (here a triangle) setup unit 110, a rasterizer 120, a texture unit 130, a per-pixel operator 140, an order determiner 150, a texture cache 160, and a texture memory 170. These modules can be implemented in hardware, software, firmware, or a combination thereof.

The triangle setup unit 110 receives vertexes defined by viewport mapping and generates triangles. Viewport mapping is known in the art so not discussed in detail herein. With the vertexes received, the triangle setup unit 110 generates triangle rasterization information from an object represented by lots of dots and transmits the triangle rasterization information to the rasterizer 120.

The rasterizer 120 generates pixels using the triangle rasterization information received from the triangle setup unit 110. In detail, the rasterizer 120 finds pixels included in the triangle received from the triangle setup unit 110 and performs interpolation on the pixels. At this time, the rasterizer 120 performs rasterization in an order adapted to the characteristics of the triangle. For this operation, the 3D graphics system 100 may perform a predetermined algorithm to determine rasterization order. For instance, the 3D graphics system 100 may include the rasterizer 120 equipped with the predetermined algorithm or a separate module which determines the rasterization order. In FIG. 1, the 3D graphics system 100 includes a separate module, i.e., the order determiner 150, to determine the rasterization order, and the rasterization is performed in the rasterization order determined or indicated by the order determiner 150. In other words, the rasterizer 120 finds and processes the pixels included in the triangle in the rasterization order (e.g., a downward or an upward order) received from the order determiner 150 and performs the interpolation of the pixels accordingly.

The order determiner 150 determines an order adapted to the characteristics of the triangle, such as use or non-use of texture mapping, use or non-use of alpha blending, and relationship with an adjacent polygon, as the rasterization order. The order determiner 150 receives triangle information from the rasterizer 120, determines the rasterization order based on the triangle information, and transmits rasterization order information corresponding to the rasterization order to the rasterizer 120. For instance, the order determiner 150 receives from the rasterizer 120 information about a position (e.g., see FIG. 5A) where rasterization of a previous triangle is finished and determines the rasterization order such that rasterization is performed toward a position farthest from the position "A" where the rasterization of the previous triangle is finished based on position information (e.g., see FIG. 5B) of a succeeding triangle adjacent to the position A.

Alternatively, the order determiner 150 may store a plurality of pieces of rasterization order information (e.g., downward order and upward order) and alternately transmit the pieces of order information to the rasterizer 120. For this operation, the order determiner 150 may store previous order information there within or may receive order information used for previous rasterization from the rasterizer 120. For instance, when the 3D graphics system 100 uses texture mapping or alpha blending, the order determiner 150 stores a plurality of pieces of rasterization order information and alternately transmits the pieces of rasterization order information to the rasterizer 120. When the 3D graphics system 100 does not use the texture mapping or the alpha blending, the order determiner 150 transmits information about one fixed rasterization order to the rasterizer 120.

Here, data remaining in cache memory after the rasterization of a previous triangle can be reused.

The process of the predetermined algorithm with which the rasterizer 120 is equipped to determine the rasterization order is similar to the process performed by the order determiner 150, so will not be repeated here.

The texture unit 130 performs texturing on the pixels generated by the rasterizer 120. In detail, the texture unit 130 filters the pixels using texture image data stored in the texture cache 160 and performs different types of blending. Here, "blending" is a process of mixing a selected layer with a layer below the selected layer to give a special effect to an image. There are many different types of blending, such as dissolve, overlay, saturation, and difference.

The texture memory 170 stores the texture image data, e.g., a picture of a human figure and/or a picture of a car, among the texture image data stored in the texture memory 170, the texture cache 160 stores necessary image data in advance so that the texture image data can be quickly provided at the request of the texture unit 130. At this time, the texture memory 170 and the texture cache 160 transmit and receive data via a system bus, in this embodiment.

The per-pixel operator 140 post-processes 3D image data using known post-processing techniques.

In the above-described embodiments, rasterization performed in units of triangles has been explained for clarity of the description, but the present invention is not restricted thereto. The present invention can be used for rasterization performed on any polygons, such as tetragons and pentagons.

Figure 2:
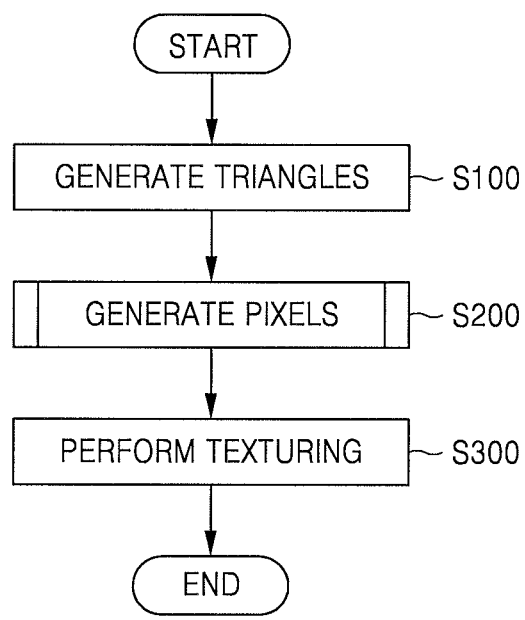
FIG. 2 is a flowchart of an embodiment of operations of the 3D graphics system illustrated in FIG. 1, according to some aspects of the present invention.

FIG. 2 is a flowchart of an embodiment of operations of the 3D graphics system 100 illustrated in FIG. 1, according to some aspects of the present invention. Referring to FIGS. 1 and 2, the triangle setup unit 110 receives vertexes defined by viewport mapping and generates triangles in operation S100. Upon receiving triangle rasterization information from the triangle setup unit 110, the rasterizer 120 generates pixels using the triangle rasterization information in operation S200. Upon receiving a result of the generation from the rasterizer 120, the texture unit 130 performs texturing on the pixels in operation 5300.

The pixel generation includes rasterization in which pixels included in a triangle are found and subjected to interpolation in operation 5200. At this time, the rasterizer 120 performs the rasterization in order (e.g., a downward or an upward order) adapted to the characteristics of the angle.

Figure 3:
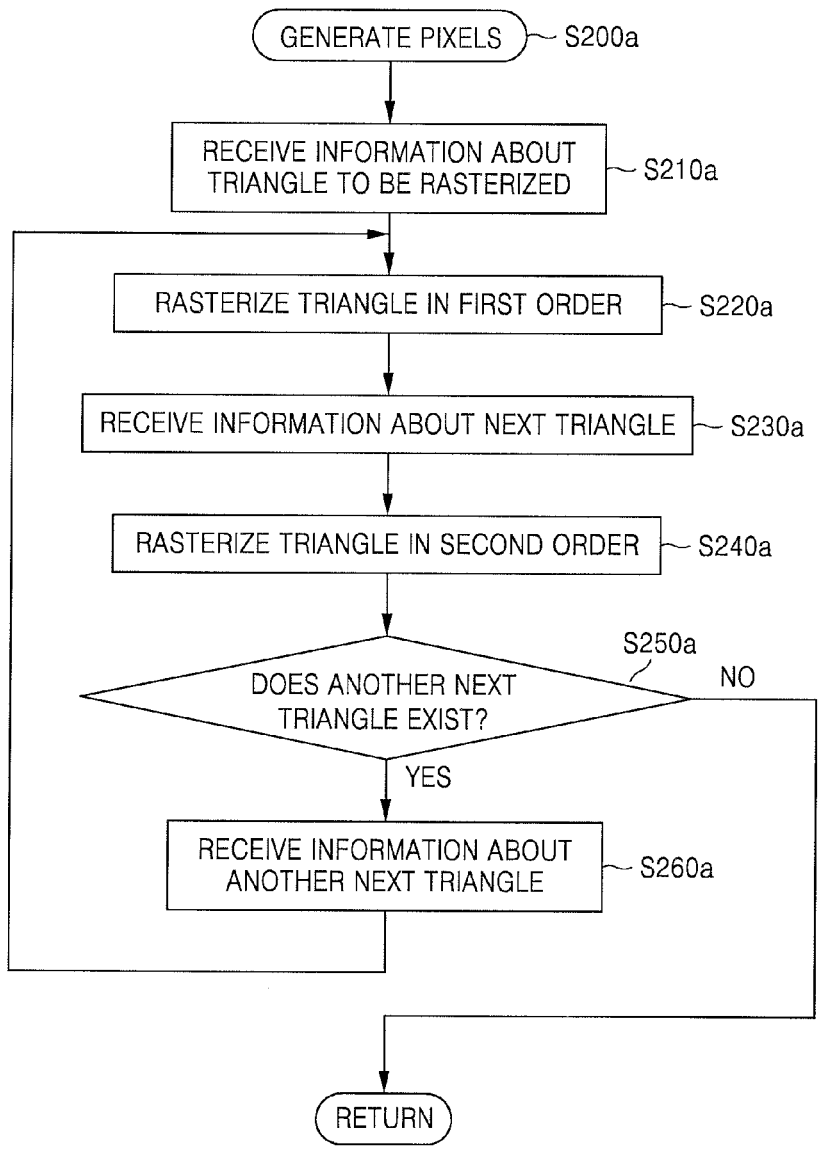
FIG. 3 is a flowchart of an embodiment of a pixel generation method illustrated in FIG. 2, according to some aspects of the present invention.
Figure 4:
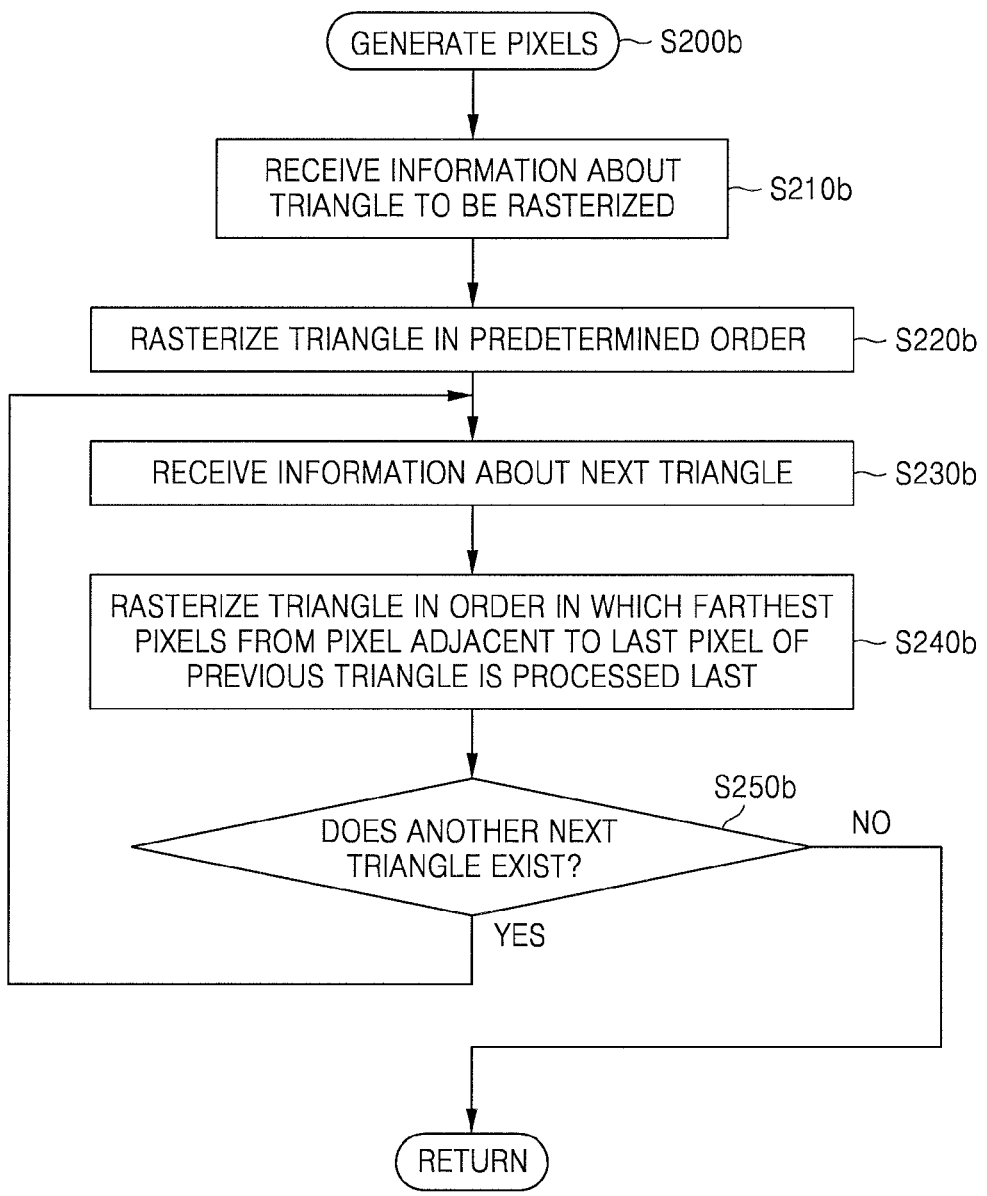
FIG. 4 is a flowchart of another embodiment of the pixel generation method illustrated in FIG. 2, according to other aspects of the present invention.

FIGS. 3 and 4 show different embodiments of pixel generation operation S200 of FIG. 2 including rasterization, in accordance with aspects of the present invention. FIG. 3 is a flowchart of a first embodiment S200a of the pixel generation 5200 operation illustrated in FIG. 2. FIG. 4 is a flowchart of a second embodiment S200b of the pixel generation S200 operation illustrated in FIG. 2. In detail, FIG. 3 shows an example of a method of performing the rasterization in an alternating manner using predetermined two or more different types of rasterization orders and FIG. 4 shows an example of a method of performing the rasterization in an order determined based on a relationship between a current triangle and an adjacent triangle, as an example of one type of polygon.

Referring to FIGS. 1 and 3, when information about a triangle (hereinafter, referred to as a "first triangle") to be rasterized is received in operation S210a, the rasterizer 120 rasterizes the first triangle in a predetermined first order in operation S220a. When receiving information about a next triangle (hereinafter, referred to as a "second triangle") in operation S230a, the rasterizer 120 rasterizes the second triangle in a predetermined second order different from the first order in operation S240a. Here, the first order may be either a downward order or an upward order and the second order may be the other one of the two types of orders. Next, when another next triangle (hereinafter, referred to as a "third triangle") exists in operation S250a, the rasterizer 120 receives information about the third triangle in operation S260a and rasterizes the third triangle in the first order.

In the first pixel generation example S200a, until all triangles have been rasterized, that is, until every triangle that can be generated using the vertexes of an object has been rasterized, the rasterizer 120 rasterizes the triangles in an alternating manner using the first order and the second order. At this time, the rasterizer 120 may receive order information about the first order and the second order from the order determiner 150.

Referring to FIGS. 1 and 4, when information about a triangle (hereinafter, referred to as a "fourth triangle") to be rasterized is received in operation S210b, the rasterizer 120 rasterizes the fourth triangle in a predetermined third order in operation S220b. When receiving information about a next triangle (hereinafter, referred to as a "fifth triangle") in operation S230b, the rasterizer 120 rasterizes the fifth triangle in an order that is different from the third order, i.e., in an order in which the farthest pixel from a pixel adjacent to the last pixel of the fourth triangle is processed last, in operation S240b. Next, when another next triangle (hereinafter, referred to as a "sixth triangle") exists in operation S250b, operations S230b and S240b are repeated. In other words, until every triangle that can be generated using the vertexes of an object has been rasterized, the rasterizer 120 repeats operations S230b and S240b. At this time, the rasterizer 120 may receive order information about the third order from the order determiner 150.

Figure 5A:
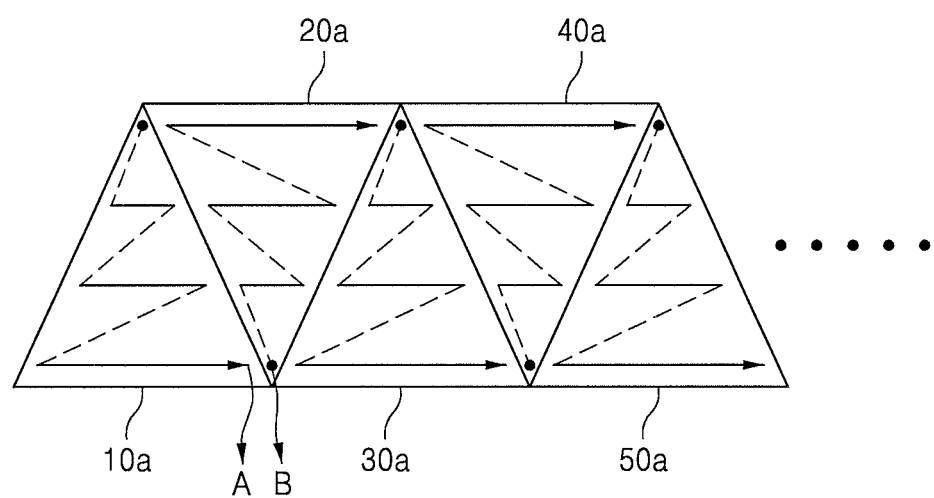
FIG. 5A illustrates an embodiment of a method of rasterizing consecutive triangles using a 3D graphics system, according to some aspects of the present invention.
Figure 5B:
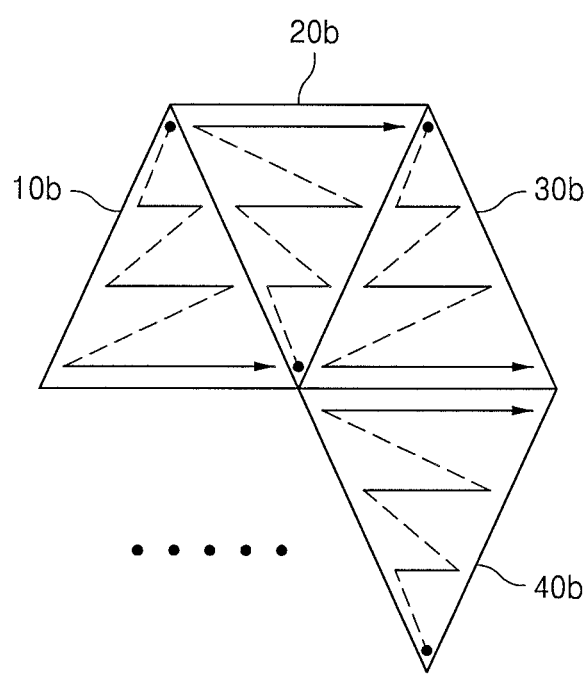
FIG. 5B illustrates another embodiment of a method of rasterizing consecutive triangles using a 3D graphics system, according to other aspects of the present invention.

FIGS. 5A and 5B illustrate different embodiments of a method of rasterizing consecutive triangles using a 3D graphics system. FIG. 5A illustrates an embodiment of a method of rasterizing consecutive triangles in a strip and FIG. 5B illustrates an embodiment of a method of rasterizing consecutive triangles in a fan.

Referring to FIG. 5A, when a first triangle 10a is rasterized in a downward order, a second triangle 20a adjacent to the first triangle 10a is rasterized in an upward order; a third triangle 30a adjacent to the second triangle 20a is rasterized in a downward order; and a fourth triangle 40a adjacent to the third triangle 30a is rasterized in an upward order. In other words, whenever a consecutive triangle is generated in the strip, the rasterization order used is different from the previous rasterization order. In addition, rasterization of a consecutive triangle starts from a position adjacent to a position at which rasterization of a previous triangle was completed.

In the method illustrated in FIG. 5B, a triangle adjacent to a previous triangle is also rasterized using an order that is different from the order used for rasterization of the previous triangle.

As described above, according to some aspects of the present invention, two different types of order are alternately used for rasterization of adjacent triangles or a triangle is rasterized in an order determined based on the characteristics of the triangle, especially, the relationship with an adjacent triangle. Accordingly, data stored in cache memory for rasterization can be reused and, therefore, the performance of a 3D graphics system can be increased.

In FIG. 5B, triangle 10b is rasterized in a downward order; triangle 20b is rasterized in an upward order; and triangle 30b is rasterized in a downward order. Triangle 40b, which is adjacent to, but below triangle 30b, is rasterized in an upward order.

According to aspects of the present invention, the coherence of the pixels is increased and the hit ratio of cache memory is thus increased. As a result, the performance of the three-dimensional graphics system is improved. With the increase of the hit ratio of the cache memory, buss traffic in the system is reduced and power consumption is thus reduced.

While exemplary embodiments in accordance with the present invention have been particularly shown and described with reference to accompanying drawings thereof, it will be understood by those of ordinary skill in the art that various changes in forms and details may be made therein. For instance, in the above-described embodiments, triangles are rasterized, but the present invention is not restricted to triangles, but can also be used for other polygons. And in some embodiments the different types of polygons can be used in the same representation of objects. Although a 3D graphics system performing rasterization in an order adapted to the characteristics of a triangle has been described, a rasterization engine used in the 3D graphics system can also be used in other 3D graphics devices, such as 3D graphics software accelerators and 3D graphics hardware accelerators. Therefore, the scope of the present invention will be defined by the following claims, and shall not be limited by the examples and embodiments disclosed herein.

What is claimed is:

1. A rasterization engine comprising:
    at least one computer processor coupled to at least one computer memory that cooperatively form a plurality of computer elements comprising:
    a polygon setup unit configured to receive vertexes defined by viewport mapping and generate polygons and rasterization information for each polygon;
    a rasterizer configured to generate pixels using the rasterization information received from the polygon setup unit and perform rasterization in an order adapted to characteristics of each polygon; and
    an order determiner configured to receive information about the characteristics of each polygon from the rasterizer, determine the rasterization order for the polygon based on the information, and transmit the rasterization order to the rasterizer,
    wherein the rasterizer receives entire of the rasterization information for each polygon before performing rasterization for each polygon.

2. The rasterization engine of claim 1,
    wherein the rasterization information comprises the characteristics of each polygon including at least one characteristic among use or non-use of texture mapping, use or non-use of alpha blending, and relationship with an adjacent polygon.

3. The rasterization engine of claim 2, wherein the order determiner:
    stores information about a first position at which rasterization of a previous polygon has finished, and
    determines the rasterization order such that rasterization of a current polygon is performed from a second position adjacent to the first position toward a third position farthest from the second position of the current polygon.

4. The rasterization engine of claim 3, wherein the order determiner:
    stores order information about different types of rasterization order in advance,
    alternately selects the different types of rasterization order, and
    determines a selected type of order as the order adapted to characteristics of a polygon to be rasterized.

5. The rasterization engine of claim 4,
    wherein the different types of order comprise a downward order and an upward order.

6. The rasterization engine of claim 4,
    wherein the order determiner stores information about an order used for a previous rasterization.

7. The rasterization engine of claim 4,
    wherein the order determiner receives information about an order used for a previous rasterization from the rasterizer.

8. A rasterization engine comprising:
    at least one computer processor coupled to at least one computer memory that cooperatively form a plurality of computer elements comprising:
    a polygon setup unit configured to receive vertexes defined by viewport mapping and generate polygons and rasterization information for each polygon;
    a rasterizer configured to generate pixels using the rasterization information received from the polygon setup unit and perform rasterization in an order adapted to characteristics of each polygon; and an order determiner configured to receive information about the characteristics of each polygon from the rasterizer, determine the rasterization order for the polygon based on the information, and transmit the rasterization order to the rasterizer, wherein the rasterizer receives necessary part of the rasterization information for each polygon during performing rasterization for each polygon.

9. The rasterization engine of claim 8, wherein the rasterization information comprises the characteristics of each polygon including at least one characteristic among use or non-use of texture mapping, use or non-use of alpha blending, and relationship with an adjacent polygon.

10. The rasterization engine of claim 9, wherein the order determiner:

stores information about a first position at which rasterization of a previous polygon has finished, and determines the rasterization order such that rasterization of a current polygon is performed from a second position adjacent to the first position toward a third position farthest from the second position of the current polygon.

11. The rasterization engine of claim 9, wherein the order determiner:

stores order information about different types of rasterization order in advance, alternately selects the different types of rasterization order, and determines a selected type of order as the order adapted to characteristics of a polygon to be rasterized.

12. The rasterization engine of claim 11, wherein the different types of order comprise a downward order and an upward order.

13. The rasterization engine of claim 11, wherein the order determiner stores information about an order used for a previous rasterization.

14. The rasterization engine of claim 11, wherein the order determiner receives information about an order used for a previous rasterization from the rasterizer.

15. A rasterization engine comprising:

at least one computer processor coupled to at least one computer memory that cooperatively form a plurality of computer elements comprising:

a triangle setup unit configured to receive vertexes defined by viewport mapping and generate triangles and rasterization information for each triangle; polygons;

a rasterizer configured to generate a group of pixels in at least one triangle using the rasterization information received from the triangle setup unit; and an order determiner configured to receive information about the characteristics of each triangle from the rasterizer, determine the rasterization order for the pixels based on the information, and transmit the rasterization order to the rasterizer.

* * * * *